Oct. 10, 1939.   E. REED ET AL   2,175,615
MEANS AND METHOD FOR WELDING SILICON STEEL SHEET STOCK
Filed May 18, 1938   2 Sheets-Sheet 1
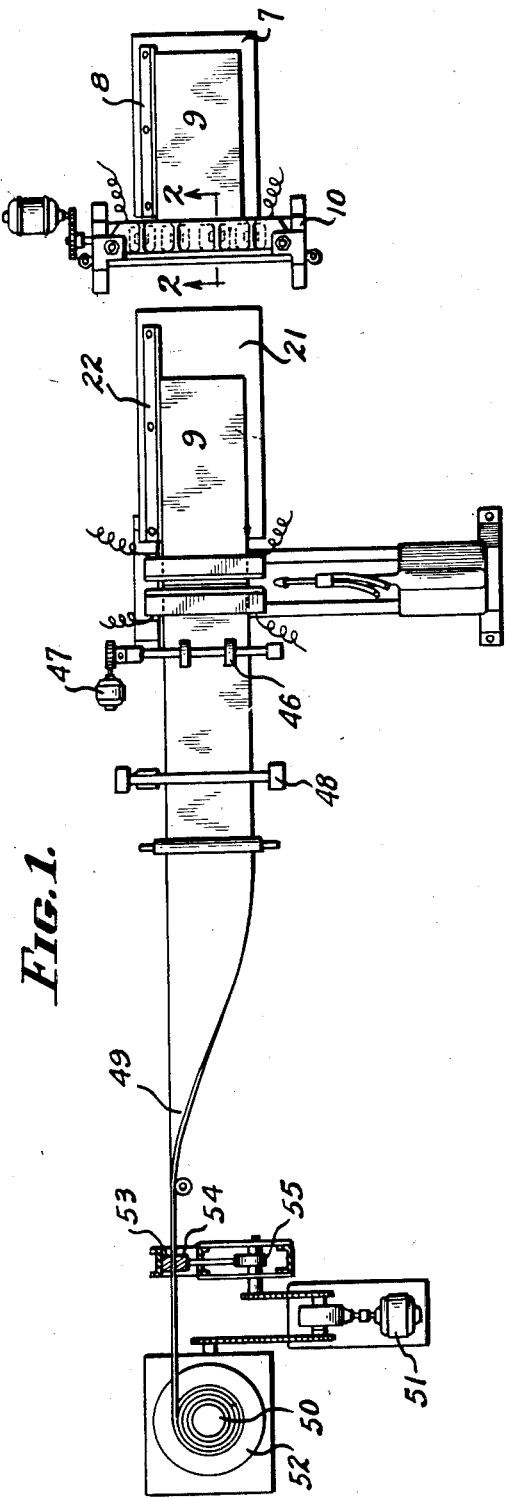
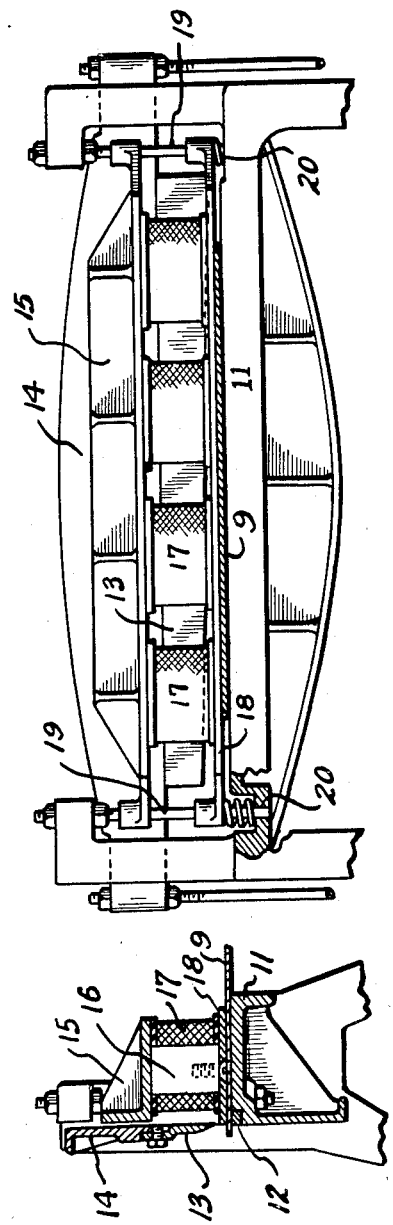
INVENTORS.
Ed Reed
AND Karl F. Wietzel.
BY Allen & Allen
ATTORNEYS.

Oct. 10, 1939.  E. REED ET AL  2,175,615
MEANS AND METHOD FOR WELDING SILICON STEEL SHEET STOCK
Filed May 18, 1938  2 Sheets-Sheet 2

INVENTORS
ED REED
AND KARL F. WIETZEL.
BY Allen & Allen
ATTORNEYS.

Patented Oct. 10, 1939

2,175,615

UNITED STATES PATENT OFFICE 2,175,615

MEANS AND METHOD FOR WELDING SILICON STEEL SHEET STOCK

Eo Reed and Karl F. Wietzel, Zanesville, Ohio, assignor to The American Rolling Mill Company, Middletown, Ohio, a corporation of Ohio Application May 18, 1938, Serial No. 208,641

2 Claims. (Cl. 113—59)

Our invention relates to the formation of butt welds in silicon steel sheet stock for the formation of strip of indefinite length therefrom. Such strip is useful in the manufacture of transformer stampings and the like, for the continuous feeding of punch presses, and for other purposes. Ordinarily, all of the silicon sheet steel stock handled and welded in this way would be considered light-gauge sheet metal.

In the co-pending application of Fay and Reed, (one of the inventors herein), Serial No. 132,824, filed March 24, 1937, there is described a method of welding thin silicon sheets, salient features of which are clamping the sheet ends under a certain pressure effective over a certain area and shearing them, afterward butting the sheet edges and clamping them under the same pressure effective over the same area so as to bring about precise coincidence, then welding the sheet edges by a gas flame. Also in a co-pending application of said Reed, Serial No. 212,039 filed June 6, 1938, there is set forth an apparatus suitable for the welding of thin silicon steel. In the practice of our present process we use certain of the features of these processes. In commercial practice the processes referred to have given excellent results in the welding of thin silicon steel of widely varying silicon content in gauges up to 31; but as the gauges become heavier, then the perfection of the results becomes less sure. More particularly in gauges ranging around 24 a tendency has been noted for the weld to be imperfect on the side opposite the torches though perfect on the torch side. When working with metals of this fineness, and considering the limitations of the general process, it is not feasible to cut the sheet edges aslant or beveled so as to let the flame get down into the space between the sheets. We have endeavored to arrange our clamping means at the welding head in planes which meet at an angle so as to get the effect of beveled sheet edges; but this has proved not to be so advantageous as the method herein disclosed.

The general objects of our invention will be apparent to one skilled in the art upon reading these specifications or will be pointed out hereinafter; in these specifications, we accomplish our objects by that certain series of process steps and by that apparatus of which we shall now describe an exemplary embodiment, reference is made to the drawings wherein:

Figure 1 is a semi-diagrammatic plan view of an assembly for making coils of silicon steel strip.

Figure 2 is a vertical view of a shear.

Figure 3 is an elevation thereof.

Figure 4:
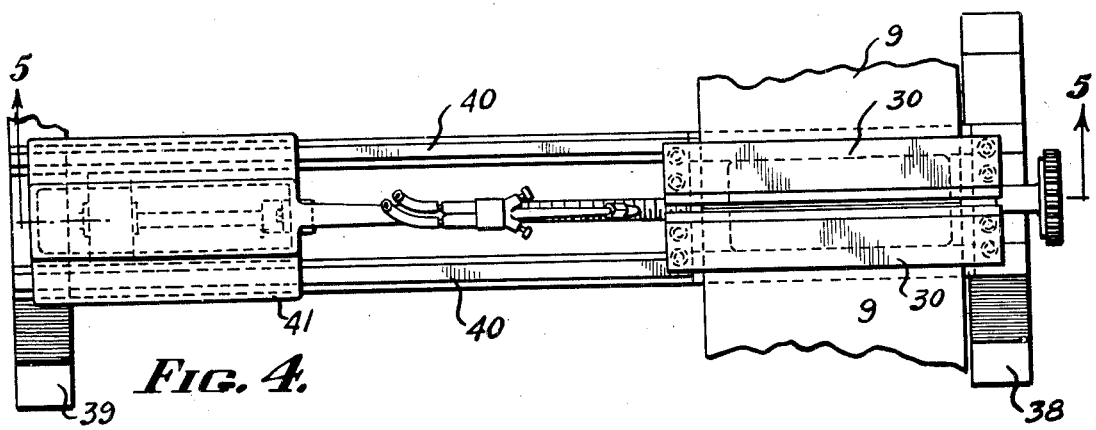
Figure 4 is a plan view of a welding machine.

Owing to the extreme difficulty of welding thin silicon steel sheets, the sheets must not only be prepared for welding in a certain way but the conditions of welding are specific in character. Thin silicon steel sheet stock is not characterized by flatness. Thus when the silicon steel is clamped, the wavy character is removed over the clamped area. After shearing and the release of the clamping pressure, the wavy character of the sheet reappears and the cut edge is no longer true. More particularly if two sheets, the ends of which have been sheared under identical conditions are merely brought together in butted relationship, or clamped under differing pressures over differing areas, the coincidence of their butted edges will not usually be perfect enough for welding. As a consequence, it is necessary both to shear and weld the sheets while the edges thereof are clamped over identical areas by identical pressures.

In Figure 1, 7 is a shear table having guide 8. A sheet 9, the edges of which are to be sheared, is resting on the table. A shear is indicated generally at 10 and is shown in more detail in Figures 2 and 3. Here 11 represents the shear bed having a fixed shear knife 12. A movable knife 13 is mounted on a suitable bridge 14 which is slidable in ways on the shear frame. Motive means for the shear blade is, of course, provided. A magnetic hold-down or clamp is likewise provided consisting of a bridge 15, core members 16 which are surrounded by coils 17, and a pole plate 18 which forms the clamping member. This structure is made vertically slidable on rods 19 on the frame of the shear, and is normally urged upwardly by compression springs 20. It will be understood that when the coils 17 are energized by electric current, the clamping means will exert a fixed pressure on the sheet 9 over the area of the pole plate 8 where it contacts the sheet. Sheets are placed on the table 7 against the guide 8 and their ends are sheared in succession, the sheets being reversed as will be understood so as to shear each end.

Figure 6:
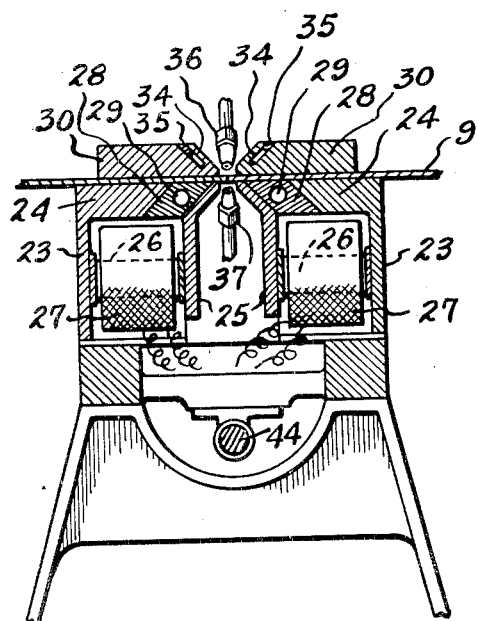
Figure 6 is a traverse sectional view taken along lines 6—6 of Figure 5.

Referring again to Figure 1, a table for the welding means is shown at 21. This table has a guide 22. The welding means comprises a pair of clamping means, one clamping means for the trailing end of the strip which has already been formed, and one clamping means for the leading end of the sheet or strip which is to be attached thereto. A cross section through the clamping means is to be found in Figure 6. Each clamping means comprises a member 23 having a pole piece 24, a second pole piece 25 and intermediate core members 26, carrying coils 7. So as to form a table for the ends of the sheet and strip respectively, we prefer to fill in the space between the pole piece 24 and the pole piece 25 with a non-magnetic metal 28, forming therein a passageway 29 for a cooling fluid. Above the mechanism just described, we provide a cooperating clamping plate 30. This plate, in the area thereof which contacts the sheet or strip respectively, has the same area as the clamping plate 18 of the shear. The coils 27 are so arranged that when they are energized by the proper current, the same clamping pressure will be had at the welding head as was produced at the shear clamp. The clamping plates 30 may be mounted, by means of rods 31, in brackets 32 on the structure and may be urged upwardly by compression springs 33. We form a passageway 34 for cooling fluid adjacent the inner edges of the clamping plates 30 as shown in Figure 6. This passageway may be formed as a slot or milling cut in the clamping plate, the upper end of which is closed by an elongated metallic plug 35.

The sheet edges have been cut square by the shearing operation described, and the sheets are clamped in butted position as shown in Figure 6. We employ in the welding pairs of torches of which we have shown a single pair in our drawings. There is an upper torch 36 and a lower torch 37; and the inner edges of the clamping plates 30 are beveled as shown so that these edges may be closely approached to the line of weld and still leave room for the passage of the upper torch 36. Similarly, the pole plates 25 below the line of weld are shaped so as to accommodate the lower torch 37.

In welding, we use a neutral gas flame. The use of a flame both above and below the line of weld causes the weld to be formed from both sides simultaneously so that a perfect weld can be secured within the permissible length of time of treatment of the thin silicon steel metals. The silicon steel is thus heated much more rapidly and is heated transversely across the butted areas of the sheets. It is necessary in this type of welding both to develop a welding heat at the butted edges and to protect the line of weld from an oxidizing atmosphere so long as the metal is at high temperature. Using a neutral flame on both sides of the line of weld makes it unnecessary to adopt any specific additional means for the protection of the metal from an oxidizing atmosphere. Steel containing large quantities of silicon is difficult to weld due to the preferential oxidation of the silicon therein into refractory silicon dioxide. In our apparatus, it will be noted that the magnetic clamping means approach the line of weld closely on both sides of the butted joint; and that the clamping means are water cooled so as to abstract heat rapidly from the sheet edges, whereby to cool the sheet edges rapidly well below the oxidation temperature elsewhere than at the area upon which the flames impinge. Also it will be noted that the flames are well pocketed at the line of weld.

Figure 5:
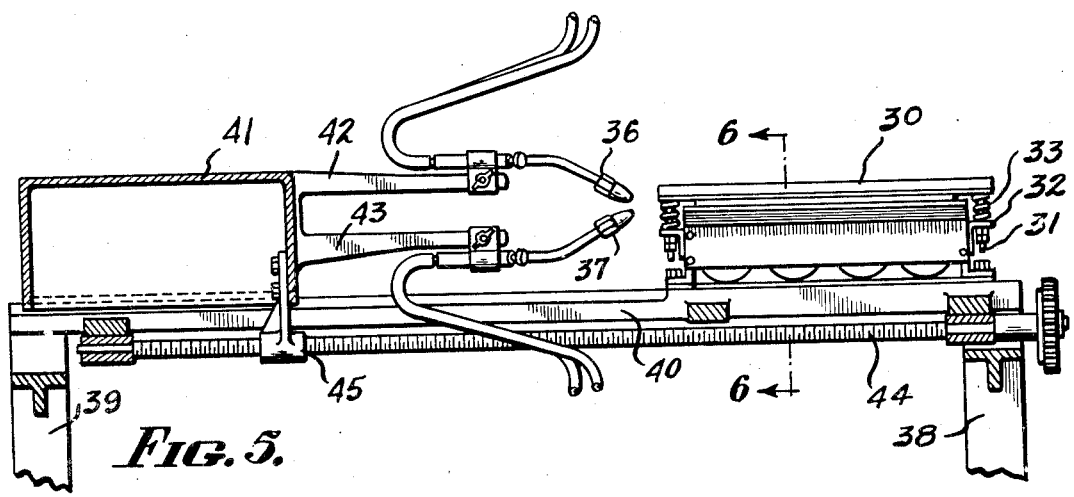
Figure 5 is a sectional view thereof taken longitudinally along lines 5—5 of Figure 4.
Figure 7:
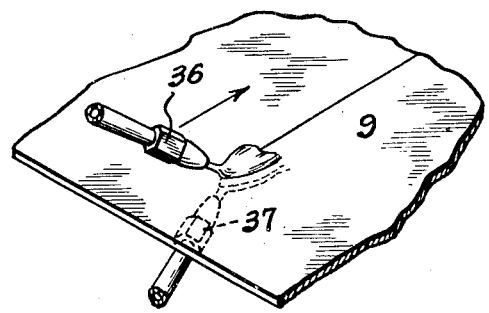
Figure 7 is a perspective view of sheets being welded end to end showing the relationship of the torches.

By following our process, welding can be done quite rapidly; and for this purpose, we provide mechanical means for moving the welding torches. In Figures 4 and 5, we have shown a machine comprising frame members 38 and 39 connected by a bridge portion 40. The clamping means hereinabove described is mounted on the bridge near one end thereof. The bridge comprises two interspaced portions which are machined to form ways. A carriage member 41 is slidably mounted on these ways. The carriage member bears a pair of arms 42 and 43 on which the torches 36 and 37 are respectively mounted in an adjustable manner. The showing of Figures 4 and 5 is semi-diagrammatic in character and it will be within the skill of the worker in the art to provide such adjustment features for the torches in connection with the arms and/or carriage as may be desired. The carriage may be moved by a threaded shaft 44 which engages a nut 45 mounted on the carriage. By means described or equivalent means, the torches are made to simultaneously traverse the line of weld in a relationship which is indicated in Figure 7.

Welding mechanism is described in the said copending application of Reed; and much of this mechanism may be employed in welding according to our present process. In fact, if desired, using a clamping arrangement such as shown in Figure 6, the welding head and associated parts of the said Reed application may be duplicated below the butted joint. It will thus be evident that portions of the welded joint may simultaneously be formed by different pairs of torches, thus increasing the speed of the operation; and it will further be evident that the various features of automatic control which characterize the apparatus of the said Reed application may be applied to the apparatus herein described.

After the welding operation, the strip may be carried away from the welding head as shown in Figure 1 by pinch rolls 46 driven by motor 47. The line of weld may thus be positioned in a rolling device 48 so as to roll the weld. This device will preferably be the device which has been illustrated and described in the applications referred to above. For forming a coil of the strip, it is first turned as at 49 from the horizontal to the vertical position and is coiled on a vertical mandrel 50 driven by a motor 51. The mandrel for a flange 52 on which the coil rests as set forth in the co-pending application of Asbury and Reed, Serial No. 132,826, filed March 24, 1937. The tight coiling of silicon steel strip or the like, not characterized by flatness, may be accomplished by making one or more turns on the mandrel loosely and then tightening these turns before making other turns. Thus as an automatic adjunct to the coiling device, and driven by the same motor, we provide a retarding means comprising an anvil 53 over which the strip passes, and friction shoes 54 which press the strip against the anvil. The friction shoes are operated by a cam arrangement 55 driven by the motor 51 so that the strip is retarded automatically at the end of each turn of the mandrel 50, or at the end of each small number of turns, while the mandrel continues to rotate. In this way a satisfactorily tight coil can be formed.

Modification may be made in our invention without departing from the spirit of it.

Having thus described our invention, what we claim as new and desire to secure by Letters Patent is:

1. A process of welding silicon steel sheets so as to form strips of indefinite length which comprises clamping the edges of said sheets under a certain force effective over a certain area and shearing the edges of said sheets perpendicularly, clamping the sheet edges in butted relationship by treating each sheet edge to the same said force effective over the said same area, and welding the butted edges of the sheets together by impinging neutral flames against the butted joints from each side thereof simultaneously while confining said flames substantially to the butted joint and while rapidly abstracting heat elsewhere from the sheets so as to confine oxidizing temperatures to those portions of the sheets on which said flames impinge.

2. In combination in apparatus for the purpose described, a shear having clamping means for sheet edges capable of exerting a certain force over a certain area, a welding device having a pair of clamping means for butted sheet edges, said clamping means capable of exerting the same said force effective over the same said area, a carriage, torches mounted on said carriage so as to impinge flames on the butted joint simultaneously and substantially oppositely from both sides, means for causing said torches to traverse the butted joints simultaneously, said clamping means so shaped as to confine the flames of said torches substantially to said butted portions, and means for cooling said clamping means to an extent sufficient to maintain the edges of said sheets below oxidation temperatures elsewhere than at the area of said sheet edges on which said flames impinge.

EO REED.
KARL F. WIETZEL.